United States Patent
Nitta

(10) Patent No.: US 9,800,759 B2
(45) Date of Patent: Oct. 24, 2017

(54) IMAGE PROCESSING APPARATUS AND IMAGE FORMING APPARATUS

(71) Applicant: KYOCERA Document Solutions Inc.

(72) Inventor: Tsuyoshi Nitta, Osaka (JP)

(73) Assignee: Kyocera Document Solutions, Inc. (JP)

( * ) Notice: Subject to any disclaimer, the term of this patent is extended or adjusted under 35 U.S.C. 154(b) by 269 days.

(21) Appl. No.: 13/847,581

(22) Filed: Mar. 20, 2013

(65) Prior Publication Data

US 2013/0258383 A1    Oct. 3, 2013

(30) Foreign Application Priority Data

Mar. 29, 2012 (JP) .................. 2012-078239

(51) Int. Cl.
| | |
|---|---|
| *H04N 1/41* | (2006.01) |
| *G06T 3/60* | (2006.01) |
| *H04N 1/40* | (2006.01) |
| *H04N 1/387* | (2006.01) |

(52) U.S. Cl.
CPC ............... *H04N 1/41* (2013.01); *G06T 3/60* (2013.01); *H04N 1/40* (2013.01); *H04N 1/3877* (2013.01)

(58) Field of Classification Search
CPC .......... H04N 1/41; H04N 1/40; H04N 1/3877; G06T 3/60
See application file for complete search history.

(56) References Cited

U.S. PATENT DOCUMENTS

| | | | | |
|---|---|---|---|---|
| 6,275,622 B1* | 8/2001 | Krtolica | ............. | G06T 3/606 |
| | | | | 382/296 |
| 2006/0104543 A1* | 5/2006 | Schweng | ............. | G06T 1/60 |
| | | | | 382/297 |
| 2007/0103722 A1* | 5/2007 | Sato | ............. | 358/1.15 |
| 2009/0059312 A1* | 3/2009 | Kitahara | ............. | 358/448 |
| 2010/0202708 A1* | 8/2010 | Fukaya | ............. | H04N 1/41 |
| | | | | 382/246 |
| 2010/0245914 A1* | 9/2010 | Harada | ............. | H04N 1/32358 |
| | | | | 358/1.16 |

FOREIGN PATENT DOCUMENTS

| | | |
|---|---|---|
| JP | H04-277980 | 10/1992 |
| JP | H08-274947 | 10/1996 |
| JP | 2004-080386 | 3/2004 |
| JP | 2007-251423 | 9/2007 |
| JP | 2009-060314 | 3/2009 |

\* cited by examiner

*Primary Examiner* — John Wallace
*Assistant Examiner* — Darryl V Dottin

(57) ABSTRACT

An image processing apparatus according to the present disclosure includes: one or more image processing modules; a first work memory disposed in a previous position to the one or more image processing modules; a second work memory disposed in a next position to the one or more image processing modules; a decompression-rotation processing module configured to (a) read out and decompress plural pieces of compressed sub-band data of plural sub-bands which locate in plural bands at an identical position in a primary scanning direction, (b) rotate respective pieces of decompressed sub-band data, and store the pieces of rotated sub-band data in the first work memory; and a rotation-compression processing module configured to (c) read out the plural pieces of image-processed sub-band data stored in the second work memory and rotate the respective pieces of sub-band data, and (d) compress the respective pieces of rotated sub-band data.

1 Claim, 4 Drawing Sheets

IMAGE PROCESSING APPARATUS AND IMAGE FORMING APPARATUS

CROSS-REFERENCE TO RELATED APPLICATIONS

This application relates to and claims priority rights from a Japanese Patent Application No. 2012-078239, filed on Mar. 29, 2012, the entire disclosures of which are hereby incorporated by reference herein.

BACKGROUND

1. Field of the Invention

The present invention relates to image processing apparatases and image forming apparatuses.

2. Description of the Related Art

An image processing apparatus divides image data into bands of which each one includes a predetermined number of lines, compresses the plural bands, and keeps the compressed plural bands in a memory or the like.

Further, another image processing apparatus identifies plural sub-bands by dividing a band in the primary scanning direction, compresses each of the sub-bands, and keeps the plural compressed sub-bands as the image data.

In order to perform image processing for the kept image data, an image processing apparatus decompresses plural pieces of sub-band data (i.e. image data of plural sub-bands) of one band to restore image data of the one band, and performs the image processing for the image data of the one band.

For such a process, a decompression processing module decompresses pieces of sub-band data to restore image data of the one band, and an image processing module performs the image processing band by band for the image data of the one band; and a work memory is disposed between them and transfers the image data from the decompression processing module to the image processing module in order to enable the both processing modules to run in parallel. The work memory includes one or more buffers, and each of the buffers has a size sufficient to store image data of one band.

In a case that the orientation of an image is "portrait", the length (i.e. number of pixels) of the image in the primary scanning direction is smaller than the length of the image in the secondary scanning direction. Contrary to this, in a case that the orientation of an image is "landscape", the length of the image in the primary scanning direction is larger than the length of the image in the secondary scanning direction. Thus, the size of image data of one band in a case that the orientation of the image is "landscape" is larger than that in a case that the orientation of the image is "portrait".

Therefore, in general, the aforementioned work memory includes the buffer of which the size is sufficient to store image data of one band in the image of which the orientation is "landscape".

As mentioned, the size of a work buffer between processing modules is set in correspondence to image data of one band in an image of which the orientation is "landscape", and consequently, the large size of the work buffer are required.

SUMMARY

An image processing apparatus according to an aspect of the present disclosure includes: one or more image processing modules; a first work memory disposed in a previous position to the one or more image processing modules; a second work memory disposed in a next position to the one or more image processing modules; a decompression-rotation processing module configured to (a) read out and decompress plural pieces of compressed sub-band data corresponding to plural sub-bands in plural band, the plural sub-bands locating at an identical position in a primary scanning direction, (b) rotate respective pieces of sub-band data obtained by decompressing the pieces of compressed sub-band data, and store the pieces of rotated sub-band data in the first work memory; and a rotation-compression processing module configured to (c) read out the plural pieces of sub-band data which the one or more image processing modules performed image processing for and stored in the second work memory and rotate the respective pieces of sub-band data, and (d) compress the respective pieces of rotated sub-band data.

Therefore, even if the orientation of the image is "landscape", the work memory stores band data of a band of which the length in the longitudinal direction is the length of the image in the secondary scanning direction, and consequently, the required size of the work memory between the processing modules is small.

An image processing apparatus according to an aspect of the present disclosure includes: an image inputting unit configured to read an image and generate image data of the image; an input image processing unit configured to compress respective pieces of sub-band data of the image data to generate pieces of compressed sub-band data as compressed image data; an image storage unit configured to store the pieces of compressed sub-band data as the compressed image data; the aforementioned image processing apparatus; an output image processing unit configured to decompress the compressed image data for which the image processing apparatus has performed the image processing; and an image outputting unit configured to output an image based on the image data obtained by the output image processing unit.

Therefore, even if the orientation of the image is "landscape", the work memory stores band data of a band of which the length in the longitudinal direction is the length of the image in the secondary scanning direction, and consequently, the required size of the work memory between the processing modules is small.

These and other objects, features and advantages of the present invention will become more apparent upon reading of the following detailed description along with the accompanied drawings.

DETAILED DESCRIPTION

Hereinafter, an embodiment according to an aspect of the present disclosure will be explained with reference to drawings.

Figure 1:
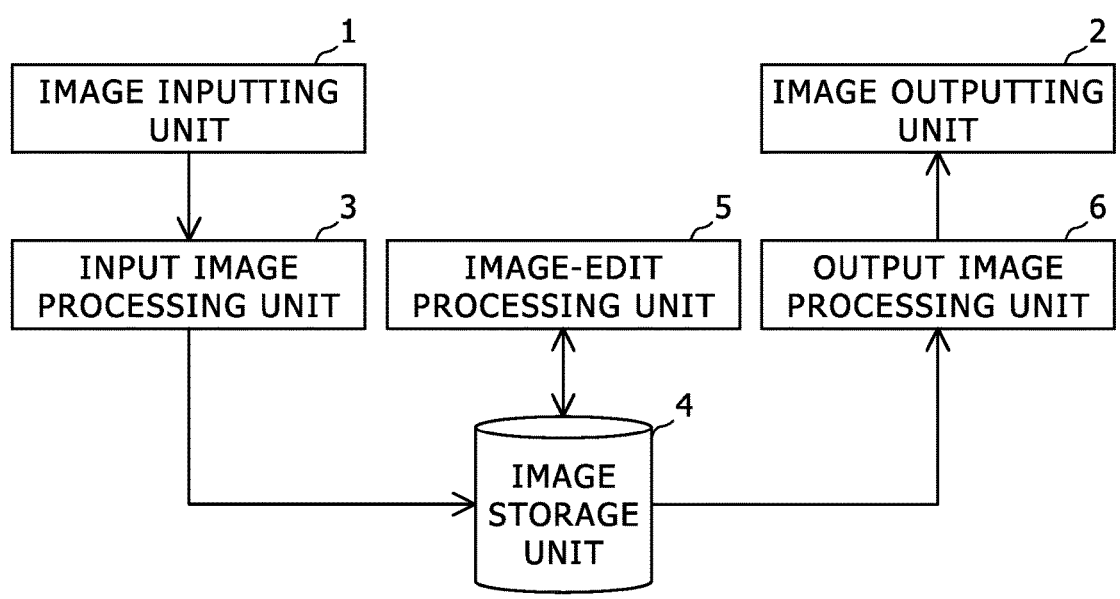
FIG. 1 shows a block diagram which indicates a configuration of an image processing apparatus according to an embodiment of the present disclosure.

FIG. 1 shows a block diagram which indicates a configuration of an image processing apparatus according to an embodiment of the present disclosure. This image processing apparatus is an image forming apparatus such as a copier or a multi-function peripheral.

An image inputting unit 1 optically reads a document image and generates image data of the document image. An image outputting unit 2 outputs an image based on output image data.

An input image processing unit 3 compresses respective pieces of sub-band data of the image data generated by the image inputting unit 1 in order to generate compressed image data. For example, the input image processing unit 3 uses JPEG (Joint Photographic Experts Group) as a compression method.

The length "a" of the sub-band in the primary scanning direction is set under the condition specified by the following formula.

$$a < (X/Y)*b$$

Where "X" is the length of an image of one page in the primary scanning direction, "Y" is the length of the image of one page in the secondary scanning direction, and "b" is the number of lines which constitute one band.

An image storage unit 4 stores the compressed image data. Specifically, image data of one page of the document image is stored as the image data which has been compressed sub-band by sub-band (i.e. the compressed image data). The image storage unit 4 is a non volatile data storage device such as a hard dish drive or an SSD (Solid State Drive) and/or a volatile data storage device such as RAM. In some cases, a low cost model (e.g. a low end model) of an image forming apparatus is not equipped with such as non volatile data storage unit.

An image-edit processing unit 5 reads out the compressed image data from the image storage unit 4, performs image processing, and writes the compressed image data for which the image processing has been performed to the image storage unit 4.

An output image processing unit 6 decompresses the compressed image data for which the image-edit processing unit 5 has performed the image processing, performs image processing in correspondence to the type of the image outputting unit 2 in order to generate the output image data, and provides the output image data to the image outputting unit 2.

In a case that the image outputting unit 2 prints an image, the output image processing unit 6 performs image processing such as a color conversion and a screen process in order to generate the output image data for printing, and provides the output image data for printing to the image outputting unit 2. In a case that the image outputting unit 2 transmits an image by facsimile communication, the output image processing unit 6 performs image processing such as a resolution conversion in order to generate the output image data for facsimile transmission, and provides the output image data for facsimile transmission to the image outputting unit 2.

The input image processing unit 3 runs when reading the image; the output image processing unit 6 runs when outputting the image; and the image-edit processing unit 5 runs when reading the image, when outputting the image, and/or when receiving a user request or the like.

One or the input image processing unit 3, the output image processing unit 6 and the image-edit processing unit 5 should rotate an image read by the image inputting unit 1 so as that the image outputting unit 2 outputs one image read by the image inputting unit 1 after the image is rotated by 90 degrees, 180 degrees, or 270 degrees. In this embodiment, either the input image processing unit 3 or the output image processing unit 6 performs such image rotation (i.e. by 90 degrees, 180 degrees, or 270 degrees). Therefore, when the image-edit processing unit 5 reads out the compressed image data from the image storage unit 4, performs image processing, and write the compressed image data for which the image processing has been performed to the image storage unit 4, the compressed image data after the image processing is finally without rotation from the compressed image data before the image processing.

Further, this image forming apparatus includes modules corresponding to sorts of the image processing. The input image processing unit 3, the image-edit processing unit 5, and the output image processing unit 6 performs a respective series of required image processing by combining the modules. For example, each of the modules is formed with an ASIC (Application Specific Integrated Circuit).

Figure 2:
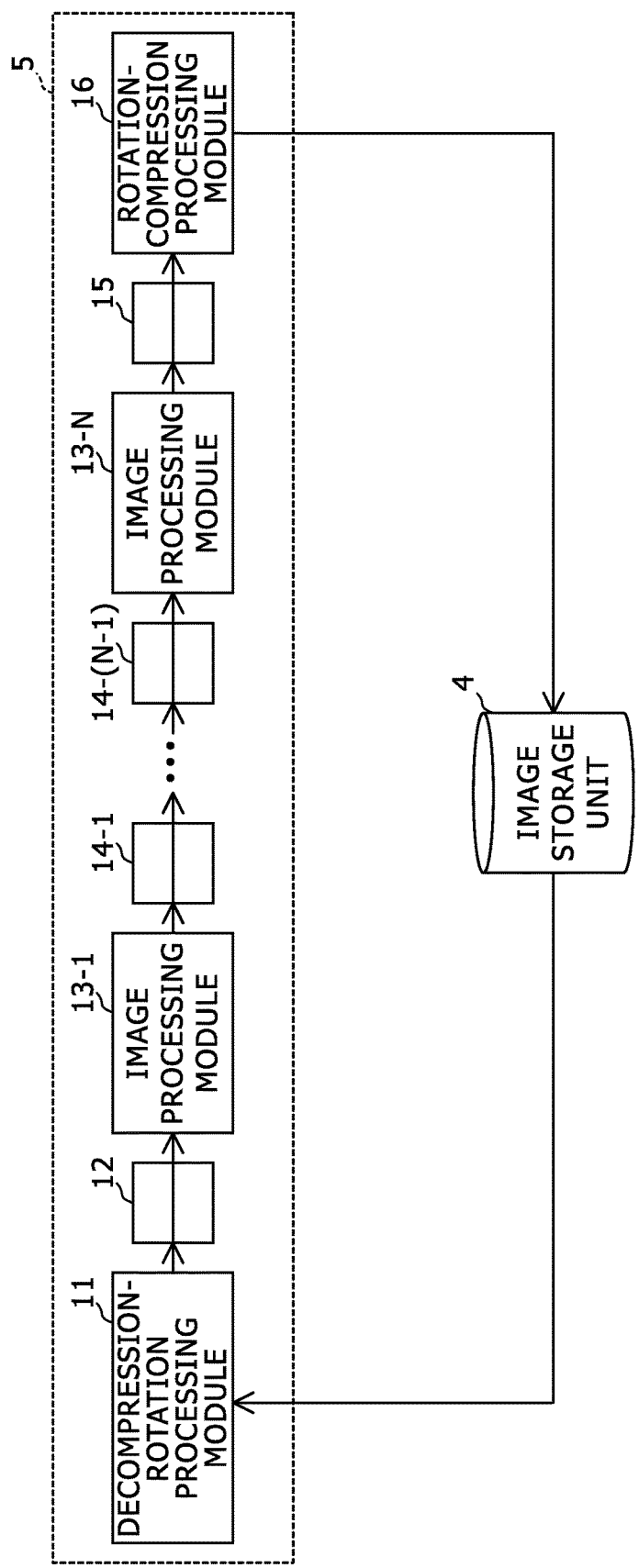
FIG. 2 shows a block diagram which indicates a configuration of the image-edit processing unit shown is FIG. 1.

FIG. 2 shows a block diagram which indicates a configuration of the image-edit processing unit 5 shown in FIG. 1.

The image-edit processing unit 5 is formed by combining a part or all of a decompression-rotation processing module 11, a work memory 12, image processing modules 13-1 to 13-N, work memories 14-1 to 14-(N−1), a work memory 15, and a rotation-compression processing module 16.

The decompression-rotation processing module 11 reads out plural pieces of unimpressed sub-band data from the image storage unit 4. These plural pieces of compressed sub-band data correspond to plural sub-bands in plural band in which the plural sub-bands locates at an identical position in a primary scanning direction. The decompression-rotation processing module 11 decompresses the plural pieces of compressed sub-band data. Further the decompression-rotation processing module 11 rotates respective pieces of sub-band data obtained by decompressing the pieces of compressed sub-band data, and stores the pieces of rotated sub-band data in the work memory 12. It should be noted that the decompression-rotation processing module 11 may be a combination of a decompression module and a rotation module.

The work memory 12 is a work memory disposed between the decompression-rotation processing module 11 and a series of the image processing modules 13-1 to 13-N.

The image processing modules 13-1 to 13-N run in parallel, and the image processing module 13-i (i=1, . . . , N) reads out image data of one band from either the work memory 12 or the work memory 14-(i−1) in the previous position, performs predetermined image processing for the image data, and writes the image data for which the image processing has been performed into either the work memory 14-i or the work memory 15 in the next position. Further, the image processing modules 13-1 to 13-N run in parallel with the decompression-rotation processing module 11.

The work memory 14-i (i=1, . . . , N) includes one or more buffers to transfer image data from the image processing module 13-i to the image processing module 13-(i+1).

The number N of the image processing module(s) 13-i (i=1, . . . , N) may be one. In such a case (N=1), the work memories 14-1 to 14-N are not required and not disposed.

The work memory 15 is a work memory disposed between a series of the image processing modules 13-1 to 13-N and the rotation-compression processing module 16.

The rotation-compression processing module 16 reads out the plural pieces of sub-band data for which image processing has been performed by the one or more image processing modules from the work memory 15 and rotates the respective pieces of sub-band data, compresses the respective pieces of rotated sub-band data, and stores pieces of compressed and rotated sub-band data into the image storage unit 4. The rotation-compression processing module 16 runs in parallel with the decompression-rotation processing module 11 and the image processing modules 13-1 to 13-N. It should be noted that the rotation-compression processing-module 16 may be a combination of a rotation module and a compression module.

In this embodiment, the decompression-rotation processing module 11 identifies the orientation of an image of the compressed image data. If the length of the image in the primary scanning direction is larger than the length of the image in the secondary scanning direction (i.e. if the orientation of the image is "landscape"), then the decompression-rotation processing module 11 rotates the respective pieces of sub-band data; otherwise if the length of the image in the primary scanning direction is either equal to or leas than the length of the image in the secondary scanning direction (i.e. if the orientation of the image is "portrait"), then the decompression-rotation processing module 11 stores the pieces of sub-band data in the work memory 12 without rotating the respective pieces of sub-band data.

Further, if the length of the image in a primary scanning direction is larger than the length of the image in a secondary scanning direction (i.e. if the orientation of the original image is "landscape"), the rotation-compression processing module 16 rotates the respective pieces of sub-band data and compresses the respective pieces of rotated sub-band data; otherwise if the length of the image in the primary scanning direction is either equal to or less than the length of the image in the secondary scanning direction (i.e. if the orientation of the original image is "portrait"), the rotation-compression processing module 16 compresses the respective pieces of sub-band data without rotating the respective pieces of sub-band data.

Furthermore, in this embodiment, the work memories 12, 14-1 to 14-(N−1), and 15 have an identical size, and each of the work memories has one or more buffers. The site of the buffer is set to be less than the size of one band in a case that the orientation of the image is "landscape" and to be either equal to or larger than a total size of the aforementioned plural pieces of sub-band data. If the work memory 12, 14-i, or 15 includes plural buffers, the plural buffers are used as double buffers or ring buffers.

In the following part, a behavior of the aforementioned image forming apparatus is explained.

Upon receiving a user operation to a not-shown operation panel, an instruction from a not-shown host device, or the like, the image inputting unit 1 reads a document image and generates image data of the document image, and the input image processing unit 3 compresses respective pieces of sub-band data of the image data in order to generate compressed image data and stores the compressed image data in the image storage unit 4.

Upon receiving a user operation to a not-shown operation panel, an instruction from a not-shown host device, or the like, the output image processing unit 6 decompresses the compressed image data for which the image-edit processing unit 5 has performed the image processing, performs image processing in correspondence to the type of the image outputting unit 2 in order to generate output image data, and provides the output image data to the image outputting unit 2. The image outputting unit 2 outputs an image based on the output image data.

The image-edit processing unit 5 runs when reading the image, when outputting the image, and/or when receiving a user request or the like, and reads out the compressed image data from the image storage unit 4, performs image processing, and write the compressed image data for which the image processing has been performed to the image storage unit 4.

A detailed behavior of the image-edit processing unit 5 is explained in the following part.

FIGS. 3A to 3C and FIGS. 4A and 4B show diagrams which explain behaviors of the image-edit processing unit shown in FIG. 2.

Figure 3A:
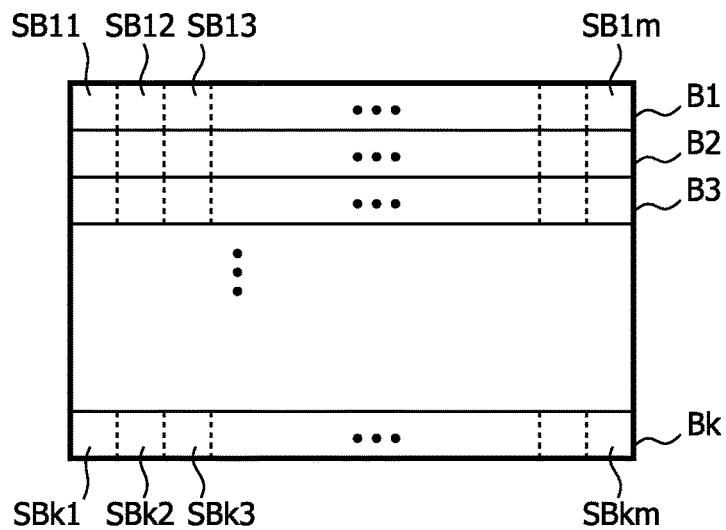
FIGS. 3A to 3C show diagrams which explain a behavior of the image-edit processing unit shown in FIG. 2 (Part 1)

FIG. 3A shows a diagram which explains band data and sub-band data in a case that the orientation of the image is "landscape". The image data shown in FIG. 3A includes pieces of band data B1 to Bk, and each piece of band data Bi (i=1, . . . , k) includes m pieces of sub-band data SBi1 to SBim.

The image data is inputted from the image inputting unit 1, piece by piece of the band data Bi in turn.

Figure 3B:
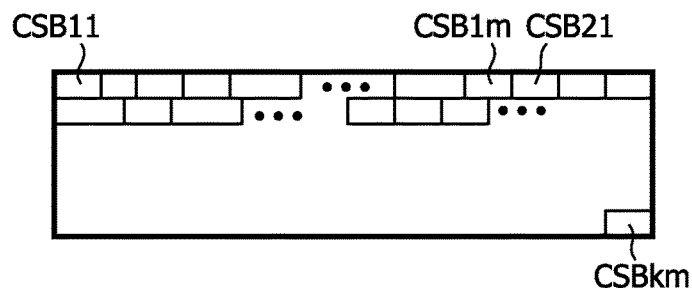

The input image processing unit 3 divides a piece of the band data bi into m pieces of the sub-band data SBi1 to SBim, compresses each piece of the sub-band data SBij (j=1, . . . , m) to generate the compressed sub-band data CSBij, and sequentially stores the compressed sub-band data CSBij into the image storage unit 4. By this process, the compressed image data as shown in FIG. 3B is stored in the image storage unit 4.

The image-edit processing unit 5 reads out this compressed image data, performs image processing, and writes the compressed image data for which the image processing has been performed into the image storage unit 4.

Figure 3C:
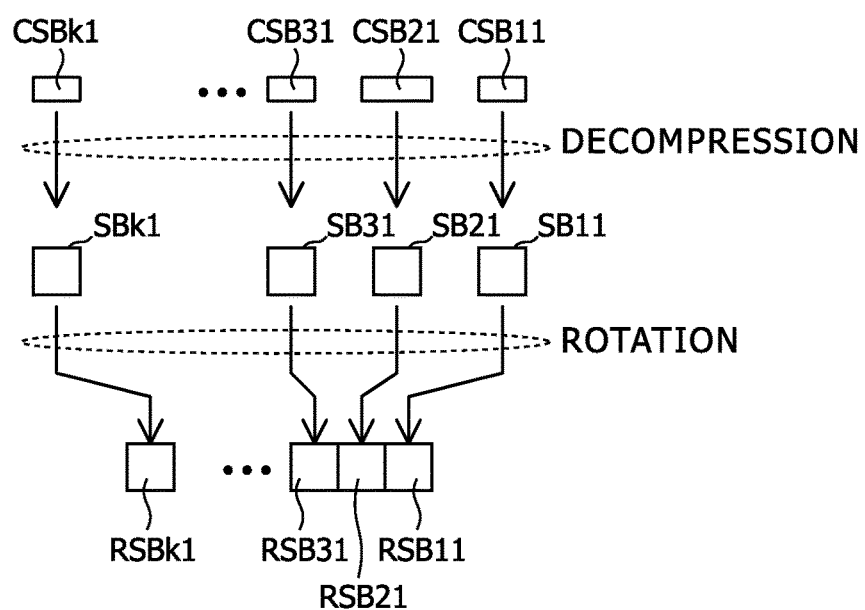

Firstly, as shown in FIG. 3C, the decompression-rotation processing unit 11 reads out the first piece of the compressed sub-band data CSBi1 (i=1, . . . , k) in each piece of the band data Bi, and restores respective pieces of the sub-band data SBi1 by decompression, rotates respective pieces of the restored sub-band data SBi1 by 90 degrees (or −90 degrees) to generate the rotated sub-band data RSBi1, and writes respective pieces of the rotated sub-band data RSBi1 of the band data Bi in turn into a buffer in the work memory 12. By this process, image data of one rotated band is stored in the work memory 12, If the work memory 12 has a free buffer, then in the same manner, the decompression-rotation processing unit 11 reads out the second piece of the compressed sub-band data CSBi2 (i=1, . . . , k) in each piece of the band data Bi, and restores respective pieces of the sub-band data SBi2 by decompression, rotates respective pieces of the restored sub-band data SBi2 by 90 degrees (or −90 degrees) to generate the rotated sub-band data RSBi1, and writes respective pieces of the rotated sub-band data RSBi2 of the band data Bi in turn into a buffer in the work memory 12.

After that, until the decompression-rotation processing unit 11 processes all pieces of the compressed sub-band data, the decompression-rotation processing unit 11 processes the third and the following (i.e. 4th, 5th, . . . ) pieces of the compressed sub-band data CSBi3 in each piece of the band data Bi in turn in the same manner.

The image processing module 13-1 reads out the image data from one or more buffers in the work memory 12 band by band, and performs image processing for each band. The buffer from which the image data has been read out becomes a free buffer.

The image processing module 13-i (i=1, . . . , N) reads out the image data of each one band from the work memory 12 or 14-(i−1) at the previous position in turn, and after performing image processing for the image data of each one band, the image processing module 13-i writes the image data of each one band to a free buffer in the work memory 14-i or 15 at the next position.

Figure 4A:
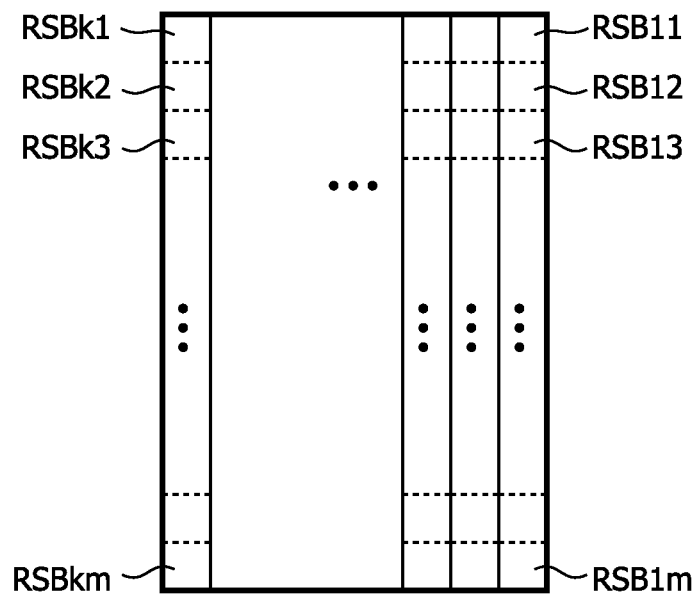
FIGS. 4A and 4B show diagrams which explain a behavior of the image-edit processing unit shown in FIG. 2 (Part 2).

Therefore, it follows that as shown in FIG. 4A, the image processing modules 13-1 to 13-N perform the same process as a process in which the image data shown in FIG. 3A is rotated by 90 degrees and the rotated image data is processed band by band.

Figure 4B:
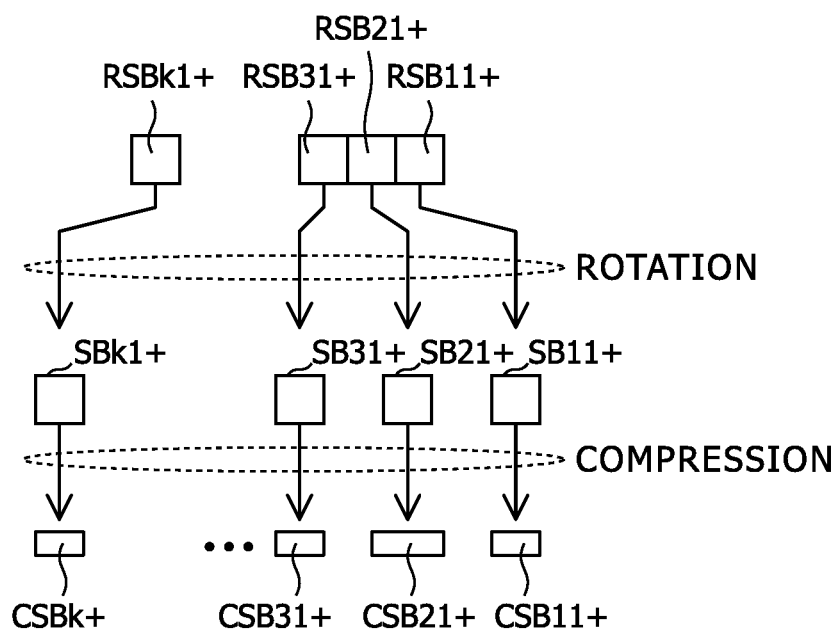

The buffer in the work memory 15 keeps pieces of the rotated sub-band data RSBij+ (i=1, . . . , k) of one band after rotation and image processing. As shown in FIG. 4B, the rotation-compression processing module 16 reads out the sub-band data RSBij+, and firstly rotates it by the same degrees as the rotation degrees of the decompression-rotation processing module 11 to the reverse direction of the rotation direction of the decompression-rotation processing module 11 to generate the image-processed sub-band data SBij+. Secondly, the rotation-compression processing module 16 compresses the sub-band data SBij+ to generate the compressed and image-processed sub-band data CSBij+, and writes the sub-band data CSBij+ to the image storage unit 4.

The rotation-compression processing module 16 performs the aforementioned process for all bands after rotation, so that the compressed image data after the image processing is stored in the image storage unit 4.

It should be noted that the decompression-rotation processing module 11, for example, determines whether the orientation of the image is "landscape" or "portrait" on the basis of not-shown attribute information in association with the compressed image data of one page, and the decompression-rotation processing module 11 and the rotation-compression processing module 16 perform the aforementioned process if the orientation of the image is "landscape" and perform the decompression and the compression without the rotation if the orientation of the image is "portrait".

In the aforementioned embodiment, the decompression-rotation processing module 11 reads out the compressed sub-band data CSBij corresponding to plural sub-band at an identical position j in the primary scanning direction in plural bands, decompresses respective pieces of the sub-band data CSBij, rotates respective pieces of the sub-band data SBij obtained by the decompression, and writes plural pieces of the rotated sub-band data RSBij to the work memory 12. The rotation-compression processing module 16 reads out the plural pieces of the image-processed sub-band data RSBij+ stored in the work memory 15, rotates respective pieces of the sub-band data RSBij+, and compresses respective pieces of the sub-band data SBij+ after rotation.

Therefore, even if the orientation of the image is "landscape", the work memory 12, 14-1, . . . , 14-(n-1) or 15 is sufficient if it is capable of storing band data of which the length in the longitudinal direction is the length of the image in the secondary scanning direction (i.e. band data of which the length is the aforementioned "Y" and the width is the aforementioned "a"), and consequently, the required size Of the work memory between the processing modules is small.

The description of the present invention has been presented for purposes of illustration and description, and is not intended to be exhaustive or limited to the invention in the form disclosed.

For example, the image-edit processing unit 5 may be an image processing apparatus as an embodiment of the present disclosure.

Further, in the aforementioned embodiment, a page memory may be disposed between the image storage unit 4 and the decompression-rotation processing module 11, and after reading out image data of one page to the page memory, the decompression-rotation processing module 11 may read out the compressed sub-band data from the page memory.

Furthermore, in the aforementioned embodiment, a page memory may be disposed between the image storage unit 4 and the rotation-compression processing module 16, and after writing the compressed sub-band data of one page to the page memory, the rotation-compression processing module 16 may write the compressed sub-band data of one page from the page memory to the image storage unit 4. In this case, pieces of the compressed sub-band data may be written to the page memory sequentially in the order of them outputted from the rotation-compression processing module 16, and the order of the compressed sub-band data may be converted to the order before the image processing (e.g. as shown in FIG. 3B) when pieces of the compressed sub-band data are written from the page memory to the image storage unit 4.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
a first work memory;
a decompression-rotation processing module configured to read out and decompress plural pieces of compressed sub-band data and store the pieces of sub-band data in the first work memory;
one or more image processing modules to process the sub-band data stored in the first work memory;
a second work memory; said second work memory connected to one or more image processing modules to store the processed sub-band data;
a rotation-compression processing module configured to read out the plural pieces of sub-band data from the second work memory and compress the respective pieces of sub-band data;
wherein the decompression-rotation processing module is further configured to identify an orientation of an image of the image data as being landscape if a length of the image in a primary scanning direction is larger than a length of the image in a secondary scanning direction and as being portrait if the length of the image in a primary scanning direction is either equal to or less than the length of the image in a secondary scanning direction;
wherein the decompression-rotation processing module is further configured to read out a column of plural sub-bands one sub-band at a time in the secondary scanning direction and rotate respective pieces of sub-band data before storing the data in the first working memory if the orientation is landscape; the column of plural sub-bands being located at an identical position in a primary scanning direction;
wherein the decompression-rotation processing module is further configured to read out a row of plural sub-bands, one sub-band at a time in the primary scanning direction; the row of plural sub-bands corresponding to one band if the orientation is portrait;

wherein the rotation-compression processing module is further configured to rotate the sub-band data before compressing the sub-band data if the orientation is landscape;

wherein the first work memory and the second work memory include respective one or more buffers and memory is allocated to a size of the buffer wherein the size of each of the one or more buffers is the size of one band if the image orientation is portrait and the size of the column of plural sub-bands located at an identical position in a primary scanning direction if the image orientation is landscape; wherein memory not allocated for the buffer is free to be used for purposes other than as the buffer; wherein:

a size of the first work memory is identical to a size of the second work memory; and a work memory is disposed between two modules among the image processing modules, and has a size identical to the size of one of the first work memory and the second work memory.

* * * * *